Figure 1:
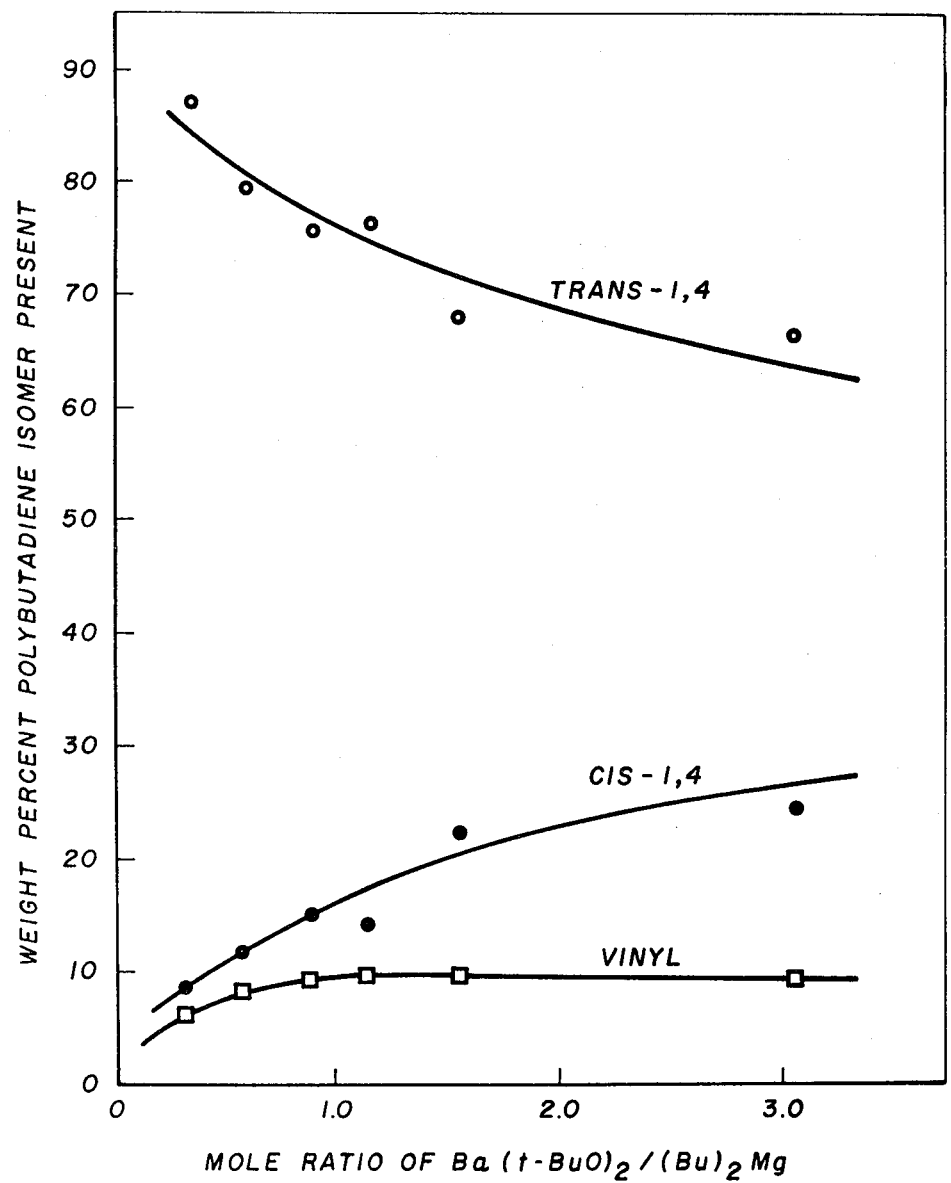

United States Patent [19]
Hargis et al.

[11] 3,903,019
[45] Sept. 2, 1975

[54] PREPARATION OF SOLUTION POLYMERS USING A BARIUM DI-TERT ALKOXIDE AND A DI-BUTYL MAGNESIUM CATALYST COMPLEX

[75] Inventors: Ivan Glen Hargis, Tallmadge; Russell A. Livigni, Akron, both of Ohio

[73] Assignee: The General Tire & Rubber Company, Akron, Ohio

[22] Filed: June 3, 1974

[21] Appl. No.: 475,380

Related U.S. Application Data

[62] Division of Ser. No. 379,507, July 16, 1973, Pat. No. 3,846,385.

[52] U.S. Cl............ 252/431 R; 260/2 A; 260/80 C; 260/82.1; 260/84.1; 260/88.3 A; 260/80.7; 260/94.3
[51] Int. Cl.².... C08F 36/00; C08F 4/10; C08F 4/46
[58] Field of Search................. 260/94.3; 252/431 R

[56] References Cited
UNITED STATES PATENTS
3,728,323  4/1973  Cheng................................ 260/94.2

*Primary Examiner*—Joseph L. Schofer
*Assistant Examiner*—Frank R. Cervi

[57] ABSTRACT

Solution polymers and rubbers can be prepared from monomers using a new catalyst complex of barium di-tert-alkoxide and a di-butyl magnesium compound. In particular, homopolymers and copolymers of butadiene with styrene, prepared with this catalyst, are uniquely characterized by the diene adducts having a low vinyl content (6–10 percent) and a high trans-1,4 structure (80–85 percent). Furthermore, the copolymer has a random comonomer sequence distribution. This molecular structure permits elastomers containing little or no styrene to have sufficient stereoregularity to crystallize.

10 Claims, 2 Drawing Figures

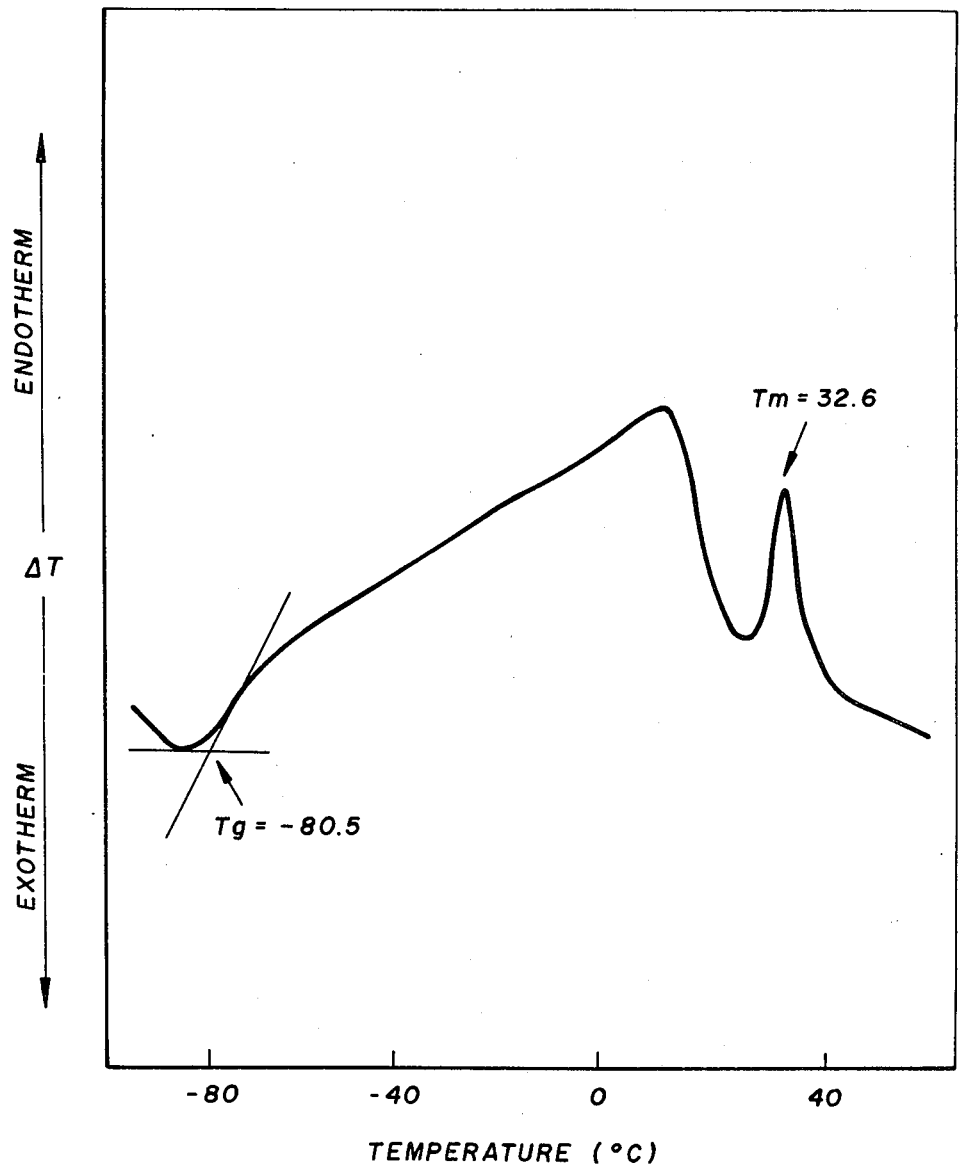

PREPARATION OF SOLUTION POLYMERS USING A BARIUM DI-TERT ALKOXIDE AND A DI-BUTYL MAGNESIUM CATALYST COMPLEX

This application is a division of prior copending U.S. Pat. application Ser. No. 379,507, filed July 16, 1973, now U.S. Pat. No. 3,846,385.

DISCUSSION OF THE PRIOR ART

Copolymers of butadiene-styrene and isoprene-styrene prepared in hydrocarbon solvents, using organolithiums, have a block-type structure [Kelley, D. J. and Tobolsky, A. V., J. Am. Chem. Soc., 81, 1597–1600 (1959) and Kuntz, I., J. Polym. Sci., 54, 569–586 (1961)]. For example, in the initial stage of a copolymerization of an equal molar mixture of butadiene and styrene, butadiene is incorporated into the copolymer much more rapidly than the styrene. Styrene is not consumed to any significant extent until the butadiene is almost totally depleted. When a small amount of a polar compound, such as tetrahydrofuran or diethyl ether, is added to this copolymerization, the reactivity of the styrene is greatly increased during the initial stage of the reaction and more random copolymers are formed. However, copolymer randomizing agents, such as these, have the disadvantage of increasing the vinyl content from the usual 8–10 percent to as high as 70 percent or more dependent on the specific compound and its concentration. Rubbers based on butadiene which possess a high vinyl structure are not desired in certain applications due to their higher glass transition temperature than the 1,4 structure.

Alkali metal tert-butoxides of Cs, Rb, K or Na have been used with organolithiums in the preparation of random butadiene-styrene copolymers (U.S. Pat. Nos. 3,294,768 and 3,324,191). By regulating the relative amounts of the two catalyst components, random copolymers have been prepared which possess low vinyl contents (8–10 percent). Alkali metal tert-butoxides were very effective in accelerating the rate at which styrene is incorporated and increasing the overall rate of copolymerization, however, lithium tert-butoxide retarded the rate of copolymerization and a block copolymer of styrene and butadiene was formed with no change in microstructure [Wofford, C. F. and Hsieh, H. L., J. Polymer Sci. Part A-1, Vol. 7, pp. 461–469, (1969)].

Since the above-mentioned finding was announced by Wofford and Hsieh, other patents have appeared which claim an organolithium and a second component as catalysts for producing solution SBR's. U.S. Pat. No. 3,506,631 teaches that aliphatic or aromatic phosphites in combination with n-butyllithium provide a random copolymer with a low vinyl content. Patent application No. 6,914,452 (Netherlands — 1969) claims an improved process for the copolymerization of butadiene and styrene using a catalyst comprised of an alkali metal oxide, hydroxide, superoxide or peroxide with an organolithium compound. The resulting copolymers have a random styrene placement with a microstructure of the diene portion the same as found for copolymers prepared with n-butyllithium. The alkali metals, sodium and potassium, have been reacted directly with organolithiums to provide catalysts for the preparation of random solution copolymers (Australian Patent Appln. No. 48,069/68). The effect of the alkali metals on the structure of the SBR was similar to that of the corresponding alkali metal salts.

More recently, U.S. Pat. No. 3,629,213 disclosed a catalyst combination of barium compounds, such as barium tert-butoxide, with organolithiums for the preparation of random solution SBR's. The trans-1,4 content of the elastomers varied from 55 to 68 percent as the mole ratio of barium tert-butoxide to n-butyllithium was increased from 0.0 to 0.5. The vinyl content of the diene segments remained constant at 10–12 percent.

Telomers of 1,3-butadiene have been prepared (U.S. Pat. No. 3,691,241) with a catalyst comprised of di-sec-butylmagnesium and potassium hydride. The catalyst is complexed with N,N,N',N'-tetramethylenediamine and the polymerization is carried out in toluene at 65°C. The microstructure of the resulting oil consisted of 38% 1,2-linkages and 60% 1,4-linkages (cis + trans).

A search of the literature through Chemical Abstracts (1956-73) did not reveal the use of dialkyl magnesiums combined with metal alkoxides as initiators of polymerization of vinyl substituted aromatic hydrocarbons or diene monomers.

Lithium Corporation of America reports in their product brochure (1971) that the organolithium complexes of these dialkyl magnesium compounds may be useful as catalysts in anionic polymerizations and as transmetalating agents in chemical synthesis.

OBJECTS

An object of this invention is to provide a novel catalyst complex of barium tert-alkoxide and di-butyl magnesium for the polymerization and copolymerization in solvent of certain ethylenically unsaturated monomers and certain epoxide or oxirane monomers.

A further object of this invention is to provide a novel process for the anionic solution polymerization and copolymerization of certain ethylenically unsaturated monomers and certain oxirane monomers to provide polymers including with certain monomers random copolymers utilizing a catalyst complex of barium di-tertalkoxide and di-butyl magnesium.

A still further object is to provide a butadiene-1,3 homopolymer or random copolymer of butadiene-1,3 and up to about a total of 25 percent of the weight of said copolymer of copolymerized isoprene and/or styrene, said homopolymer or copolymer exhibiting crystallinity on stretching when uncompounded and uncured, a low vinyl content and at least 70% trans-1,4 content.

SUMMARY OF THE INVENTION

It has been discovered that a hydrocarbon soluble catalyst complex of

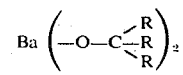

in which the R's can be the same or different and are selected from the group consisting of methyl, ethyl and propyl radicals and dibutyl magnesium in which at least about 30 mole % of the butyl groups are secondary butyl radicals, and where the mole ratio of said barium compound to said magnesium compound is from about 0.25 to 3.25, can be used in a minor effective amount to polymerize under inert conditions at a temperature of from about −90° to 100°C. in a hydrocarbon solvent, a polymerizable monomer selected from the group consisting of vinyl monomers having an activated double bond and oxirane monomers consisting of carbon, hydrogen and oxygen to from a polymer, said monomers having up to 14 carbon atoms and being free of groups which would destroy the catalyst complex and said solvent being a solvent for said catalyst complex, said monomer and said polymer.

Depending on the monomer employed, the resulting polymers can be rubbery or resinous, thermoplastic or thermosetting.

Preferred monomers to make rubbery homopolymers and rubbery random copolymers are butadiene-1,3,isoprene and styrene.

With respect to butadiene-styrene rubbery copolymers of this invention, they have a random placement of styrene units, a high trans-1,4 content (80 percent) and a low vinyl unsaturation (6–10 percent). Polymerizations can be carried out in toluene using this catalyst system. Either of the catalyst complex components alone is not capable of initiating the polymerization of butadiene and styrene or their copolymerization. However, a mixture of these compounds in hydrocarbon solvents is an effective initiator for styrene and butadiene polymerizations. By varying the mole ratio of the components of the catalyst, namely, $Ba(t-BuO)_2/(Bu)_2Mg$, it is possible to alter both the microstructure of the diene units and the rate of copolymerization. The comonomer sequence distribution of the solution SBR's is random for preferred mole ratios of $Ba(t-BuO)_2/(Bu)_2Mg$ from about 0.3 to 3.0. These copolymers can exhibit green strength and tack which is of value in building tires. Applications can also be made in other products requiring an elastomer which has good strength under dynamic conditions.

These and other objects and advantages of the present invention will become more apparent to those skilled in the art from the following detailed description, examples and accompanying drawings in which:

FIG. 1 is a graph showing the dependence of the polybutadiene microstructure (of the butadiene units in a rubbery butadiene-styrene copolymer prepared according to the present invention) on the composition of a barium di-tertiary butoxide/di-butyl magnesium complex catalyst; and FIG. 2 is a graph showing a differential thermogram of a solution butadiene-styrene rubbery copolymer prepared according to the present invention with high trans-1,4-polybutadiene placements or units and showing the melting temperature (Tm) and glass transition temperature (Tg).

DISCLOSURE OF DETAILS AND PREFERRED EMBODIMENTS

The barium tertiary alkoxide may be obtained by reacting barium metal in a liquid amine solvent with a tertiary carbinol at a temperature of from about −100°C. to the boiling point of the solvent such as tertiary butanol or other tertiary carbinol having the formula $(R)_3C-OH$ where R is methyl, ethyl or propyl such as 3-ethyl-3-pentanol, 4-propyl-4-heptanol, 2-methyl-2-butanol, 2-methyl-2-pentanol, 3-methyl-3-hexanol and the like and mixtures thereof. The resulting barium tertiary alkoxides have the formula

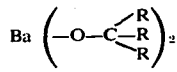

where R is methyl, ethyl or propyl and R can be the same or different.

The solvent used in preparing the barium alkoxide component or moiety is selected from the group consisting of saturated nonpolymerizable aliphatic, cycloaliphatic and heterocyclic, primary and secondary, mono amines and polyamines and mixtures thereof, having from 1 to 36 carbon atoms and from 1 to 5 nitrogen atoms and being a liquid at a temperature of from about −100° to +50°C. or the boiling point of the solvent and at a pressure of from about 0.25 to 10 atmospheres. Examples of such amines are methylamine, dimethylamine, ethylamine, n-propylamine, n-butylamine, n-amylamine, n-hexylamine, laurylamine, ethylene diamine, trimethylene diamine, pentamethylenediamine, hexamethylenediamine, di-n-propylamine, di-isopropylamine, diethylamine, cyclohexylamine, N-butyl cyclohexylamine, N-ethylcyclohexylamine, N-methyl cyclohexylamine, p-menthane-1,8-diamine, diethylene triamine, cyclopentylamine, diamylamine, dibutylamine, diisoamyl amine, diisobutylamine, dioctadecylamine, dicyclohexylamine, piperidine, pyrrolidine, N,N'-diethyl ethylene diamine, N,N'-dimethyl ethylene diamine, butyl ethylamine, didodecylamine, dioctylamine, di-2-octyl amine, tetraethylene pentamine, 3-aminomethyl-3,5,5-trimethyl cyclohexylamine, and the like and mixtures thereof. Lower molecular weight amines are preferred since less is required to solvate the metal.

In preparing the barium tertiary alkoxide catalyst, sufficient amine solvent is employed to dissolve the metal. Preferably, an excess of the amine is employed. When preparing catalysts at low temperatures, it is not necessary to use pressure equipment. However, pressure equipment can be employed, and the process of preparing the catalyst can occur at pressures of from about 0.25 to 10 atmospheres. During preparation of the catalyst it is desirable to agitate the reaction mixture during addition and reaction of the reagents. Further, it is preferred that an inert atmosphere, for example, helium, neon, or argon, should be over the reaction mixture at all times to prevent contact of the product with oxygen, water vapor or carbon dioxide. Of course, in place of the inert gas, the vapor of the organic compound and/or amine can be used as the "inert atmosphere." Closed reactors should be employed. While the barium di-tert alkoxide can be prepared in bulk, such is not desirable since the reaction is slow and not as quantitative, since it is necessary to use a large excess of alcohol, and since it is difficult to separate the excess alcohol.

After preparation of the barium tertiary alkoxide, the amine is separated by distillation, vacuum evaporation, solvent extraction and so forth utilizing temperatures, pressures and solvents which do not adversely affect the alkoxide. The amine may simply be evaporated from the alkoxide, any tertiary carbinol removed and the alkoxide dispersed or dissolved in one or more of the hydrocarbon solvents used for polymerization along with the diorganomagnesium compound to form the catalyst. Since the amount of catalyst solution is so small in relation to the other materials, the hydrocarbon solvent used for the catalyst does not necessarily have to be, but is preferred to be, the same as that used for the polymerization solvent. Dilute solutions of the catalyst in the hydrocarbon solvents are generally preferred for injection into the polymerization reactor.

Dibutyl magnesium compounds are commercially available and can be prepared by methods known to the art. For example, see Kamienski and Eastham, "The Journal of Organic Chemistry," 34, No. 4, pp. 1116-1121 (April, 1969) and U.S. Pat. No. 3,646,231 (1972). They should be soluble in the hydrocarbon solvents used in the solution polymerization. The dibutyl magnesium may be monomeric, dimeric or even polymeric although on elementary analysis they show $Mg \cdot (C_4H_9)_2$. Of the butyl groups of the dibutyl magnesium at least about 30 mole % should be secondary butyl groups for increased solubility in hydrocarbon solvents. Examples of such compounds are $(n-C_4H_9)Mg(sec-C_4H_9)$, $(n-C_4H_9)_2Mg \cdot (sec-C_4H_9)_2Mg$, $[(n-C_4H_9)Mg(sec-C_4H_9)]_2 \cdot (n-C_4H_9)_2Mg$, $[(n-C_4H_9)_2Mg]_2 \cdot (sec-C_4H_9)_2Mg$, and $(sec-C_4H_9)_2Mg \cdot (sec-C_4H_9)_2Mg$ and the like and mixtures thereof. Dilute solutions of the dibutyl magnesium catalyst in the hydrocarbon solvents used in the solvent polymerization process are generally employed. Preferably the hydrocarbon solvent used is the same as the one used during polymerization.

Prior to polymerization the barium alkoxide hydrocarbon solution and the dibutyl magnesium hydrocarbon solution are mixed together and the barium compound and magnesium compound permitted to complex or react to form the catalyst. The amount of time required to form the complex ranges from about 5 minutes to 1 hour, preferably from 15 to 30 minutes depending on the reaction temperature. This should be accomplished under an inert atmosphere and the ingredients may be heated to speed reaction at temperatures of from about 25° to 100°C., preferably from about 40° to 60°C. After the complex has formed, the polymerization solvent and monomer(s) may be added to it or the preformed catalyst dissolved in its solvent may be injected into a reactor containing the monomers dissolved in the hydrocarbon polymerization solvent.

The barium di-tertiary alkoxide and the dibutyl magnesium compound are reacted together as discussed above to provide a catalyst complex or reaction product in which the mole ratios of the $Ba(t-BuO)_2$ to $(Bu)_2Mg$ are from about 0.25 to 3.25, preferably from about 0.30 to 3.0.

The polymerizable vinyl monomers are those having an activated unsaturated double bond, for example, those monomers where adjacent to the double bond there is a group more electrophilic than hydrogen and which is not easily removed by a strong base. Examples of such monomers are nitriles like acrylonitrile, methacrylonitrile; amides like acrylamide, methacrylamide; acrylates and alkacrylates like methyl acrylate, ethyl acrylate, butyl acrylate, ethyl hexyl acrylate, octyl acrylate, methyl methacrylate, ethyl methacrylate, butyl methacrylate, methyl ethacrylate, ethyl ethacrylate, butyl ethacrylate, octyl ethacrylate; the alkaline earth metal salts such as the Ba, Ca and Sr salts of the acrylic and alkacrylic acids such as acrylic, methacrylic and ethacrylic acid; the dienes such as butadiene-1,3, isoprene and 2,3-dimethyl butadiene; and the vinyl benzenes like styrene, alpha-methyl styrene, p-tertiary butyl styrene, divinyl benzene, methyl vinyl toluene, and para vinyl toluene and the like and mixtures of the same. The polymerizable oxirane monomers are those of carbon, hydrogen and oxygen and having a ring of two carbon atoms and one oxygen and which will readily open and polymerize to form polyethers. Examples of oxirane monomers which can be employed are ethylene oxide, propylene oxide, butylene oxide, isobutylene oxide, allyl glycidyl ether, crotyl glycidyl ether, isoprene monoxide, butadiene monoxide, vinyl cyclohexene monoxide and the like and mixtures thereof. These monomers have up to 14 carbon atoms and are free of groups such as atoms, radicals and the like which would destroy the catalyst complex.

Preferred monomers to use are butadiene-1,3, and mixtures of butadiene-1,3 and up to about 25 percent by weight total of the mixtures of styrene and/or isoprene to make rubbery homopolymers and rubbery random copolymers exhibiting crystallinity when stretched in the uncompounded and uncured state, at least 70% trans-1,4 units, more preferably from about 80 to 85% trans 1,4 units, a vinyl content of not over about 10 percent, and a number average molecular weight up to about 300,000. Moreover, by altering the butadiene homopolymer or butadienecopolymer composition or microstructure a rubber can be prepared which does not crystallize at room temperature but can undergo crystallization on stretching. This behavior closely simulates that of natural rubber. Thus, it is within the scope of this invention to prepare polymers which can serve as replacements in those applications where natural rubber is employed such as in tires. The number-average molecular weight is governed by the ratio of grams of monomer polymerized to moles of carbon-magnesium charged. Conversions to polymer in the range of 80–90 percent are usually obtained, although quantitative conversions can be reached. Molecular weight distributions can be narrow or broad dependent on reaction conditions. For example, the molecular weight distribution can be controlled by the polymerization temperatures used, rate of addition of monomer(s) or catalyst and so forth.

Temperatures during solution polymerization can vary from about −90° to 100°C. Time for polymerization will be dependent on the temperature, amount of catalyst, type of polymers desired and so forth. Only minor amounts of catalyst complex are necessary to effect polymerization. However, the amount of catalyst employed may vary with the type of polymer desired. For example, when making polymers having a high average molecular weight using a given amount of monomer and catalyst, only a small amount of the catalyst complex is necessary whereas when making a low average molecular weight polymer, larger amounts of the catalyst complex are employed. Moreover, since the polymer is a living polymer, it will continue to grow as long as monomer is fed to the polymerization system. Thus, the molecular weight can be as high as a million, or even more. On the other hand, very high molecular weight polymers require lengthy polymerization times for a given amount of the catalyst complex; at lower catalyst concentrations the polymerization rate drops. Moreover, high molecular weight polymers are difficult to handle in the polymerization reactor and on rubber mills and the like. A useful range of catalyst complex to obtain readily processable polymers in practicable times is from about 0.00001 to 0.002, preferably from about 0.0003 to 0.0009, mole of catalyst complex computed as dibutyl magnesium per 100 grams of monomer(s).

Since the polymer in solution in the polymerization media is a living polymer or since the polymerization is a non-terminating polymerization (unless positively terminated by failure to add monomer or by adding a terminating agent), block polymer can be prepared by sequential addition of monomers or functional groups can be added. For example, since the living polymer contains terminal metal ions it can be treated with an epoxide like ethylene oxide and then with water to provide polymers with terminal hydroxyl groups for reaction with polyisocyanates to make polyurethanes.

The polymerization is conducted in a solvent. While bulk polymerization may be used, such presents heat transfer problems which should be avoided. In solvent polymerizations it is preferred to operate on a basis of not over about 15 to 20% polymer solids concentration in the solvent to enable ready heat transfer and processing. Solvents for the monomers and polymers should be those which do not act as chain terminating agents and should be hydrocarbon solvents liquid at room temperature (about 25°C.) such as benzene, toluene, the xylenes, the trimethyl benzenes, hexane, heptane, octane, nonane, cyclohexane, cycloheptane, cyclooctane and the like and mixtures of the same.

Polymerization should, of course, be conducted in a closed reactor, preferably a pressure reactor, fitted with a stirrer, heating and cooling means, with means to flush with or pump in an inert gas such as nitrogen, neon, argon and so forth in order to polymerize under inert or non-reactive conditions, with means to charge monomer and catalyst, and with means to recover the resulting polymer and so forth.

After polymerization the catalyst may be terminated by adding water, alcohol or other agent to the polymeric solution. After the polymer has been recovered and dried a suitable antioxidant such as 2,6-di-tert-butyl-p-cresol may be added to the same. However, the antioxidant may be added to the polymeric solution before it is stripped of solvent.

The polymers produced by the method of the present invention can be compounded and cured in the same manner as other plastic and rubbery polymers. For example, they can be mixed with sulfur or sulfur furnishing materials, peroxides, carbon black, $SiO_2$, $TiO_2$, $Sb_2O_3$, red iron oxide, phthalocyanine blue or green, tetramethyl or ethyl thiuram disulfide, benzothiazyl disulfide and the like. Stabilizers, antioxidants, UV light absorbers and other antidegradants can be added to these polymers. They can also be blended with other polymers like natural rubber, butyl rubber, butadiene-styrene-acrylonitrile terpolymers, polychloroprene, SBR, polyurethane elastomers and so forth.

The polymers produced by the method of the present invention can be used as paints, protective coatings for fabrics; in making fibers and textiles, body and engine mounts for automobiles, gaskets, treads and carcasses for tires, golf balls, golf ball covers, belts, hose, shoe soles, motor mounts, foamed plastic insulation for buildings, tote boxes, electric wire and cable insulation, and as plasticizers and polymeric fillers for other plastics and rubbers.

The following examples will serve to illustrate the present invention with more particularity to those skilled in the art. In these examples and throughout the remaining specification and claims all parts and percentages are by weight unless otherwise specified. Also, in these examples all reactions and polymerizations were conducted in closed, stirred vessels under nitrogen, argon or neon (inert atmosphere). In the examples, the order of addition of materials to the reactor was as follows: solvent, $(Bu)_2Mg$ solution, $Ba(t\text{-}BuO)_2$ solution and comonomers (first butadiene-1,3 and then styrene). The total amount of $(Bu)_2Mg$ included an amount sufficient to purge the system in addition to the amount required for the polymerization charge. In each case, the complex of $(Bu)_2Mg$ and $Ba(t\text{-}BuO)_2$ was formed by reacting the solutions of the two components in the reactor for 30 minutes at 50°C. to give a clear, slightly colored (yellow) solution when cyclohexane was used as a solvent. The comonomers were then added to the preformed complex.

EXAMPLE I

The effect of the mole ratio of $Ba(t\text{-}BuO)_2/(Bu)_2Mg$ on the structure and molecular weight of copolymers of butadiene and styrene formed is summarized in Table I, below:

TABLE I

Structure of Butadiene-Styrene Copolymers Prepared With The Barium t-Butoxide-Dibutyl Magnesium Catalyst

| Run No. | Mole Ratio $Ba(t\text{-}BuO)_2/(Bu)_2Mg$ | Final % Conv. by wt. | % Styrene by wt. | Polybutadiene Microstructure % Trans | % Vinyl | MW Estimated From GPC $\overline{M}_n$ | $\overline{M}_w/\overline{M}_n$ |
|---|---|---|---|---|---|---|---|
| 1 | 0.32 | 43.15 | 11.4 | 85.3 | 6.1 | 44,392 | 1.38 |
| 2 | 0.56 | 79.10 | 14.7 | 79.4 | 8.4 | 68,150 | 2.19 |
| 3 | 0.86 | 70.86 | 14.6 | 75.9 | 9.4 | 61,276 | 2.14 |
| 4 | 1.08 | 70.95 | 14.7 | 76.5 | 9.4 | 60,896 | 2.12 |
| 5 | 1.53 | 83.40 | 14.0 | 67.8 | 9.4 | 110,020 | 2.18 |
| 6 | 3.17 | 83.21 | 16.6 | 66.7 | 9.0 | 112,949 | 2.18 |
| 7 | Only $(Bu)_2Mg$ | 0 | — | — | — | — | — |

Polymerization conditions:

1. Polymerizations were carried out in cyclohexane as a solvent at 50°C. for 24 hours.
2. Molar concentrations of comonomers and $(Bu)_2Mg$ were: $[(Bu)_2Mg] = 1.25 \times 10^{-3}$, [Butadiene] = 2.1 and [Styrene] = 0.20.
3. After polymerization the reactor was vented, and the solvents were stripped from the copolymer which was then tested.

These results show that the trans-1,4 content decreases as the mole ratio of $Ba(t\text{-}BuO)_2/(Bu)_2Mg$ increases, with little variation in either the vinyl content or heterogeneity index. GPC means gel permeation chromotogram.

Thus, as shown in the above Table and in FIG. 1 the trans-1,4/cis-1,4 ratio of the diene adducts increases as the $Ba(t\text{-}BuO)_2/(Bu)_2Mg$ mole ratio decreases, and the vinyl content remains at a low range of values (6-10%) for all mole ratios of $Ba(t\text{-}BuO)_2/(Bu)_2Mg$ from 0.3 to 3.0. This shows the dependence of the butadiene microstructure on catalyst composition. Also, as shown in the above Table and in FIG. 2 the copolymer of Run 1 had a well defined crystalline melting point at 32.6°C. and a glass transition temperature of −80.5° as shown by differential thermal analysis indicating stereoregularity.

The rate of copolymerization of styrene and butadiene increased as the mole ratio of Ba(t-BuO)$_2$/(Bu)$_2$Mg increased.

Notes:
a. Preparation of Barium Tert-Butoxide:

Barium tert-butoxide was prepared by reacting two moles of tert-butanol with one gram-atom of barium. The reaction was carried out in liquid monomethylamine in which the metal reacts in the form of the solvated metal and the metal dimethylamide with the alcohol at a temperature of about −50°C. After reaction, the amine was evaporated and the Ba(t-BuO)$_2$ was dissolved or slurried in benzene. The amine solvent provides a very reactive form of the metal to insure complete reaction with the alcohol.

b. n-Butyl sec-Butyl Magnesium Stock Solution:

Dibutylmagnesium (in which 50 mole % of the butyl radicals were secondary butyl radicals) was obtained from Lithium Corporation of America in a solution of n-hexane and cyclohexane (95%-hexane) with a carbon-magnesium content of 1.33 meq/ml. This solution was diluted with toluene to 0.15 meq/ml and assayed for carbon-magnesium by titration with sec-butyl alcohol in xylene using 9,10-phenanthroline as an indicator, according to Watson, S. C. and Eastham, J. F., J. Organometal Chem. 9, 165 (1967). The diluted dibutyl magnesium solution was used to react with the solution of the barium alkoxide.

c. Styrene:

This monomer was purchased from the C. P. Hall Co. and purified by vacuum distillation from calcium hydride.

d. Butadiene-1,3:

This monomer was purchased from El Paso Products, Texas, as a rubber grade material. Purification was accomplished by distillation in the presence of n-butyllithium in mineral oil.

e. Hydrocarbon Solvents:

ACS, reagent grade solvents were used. They were distilled in an inert atmosphere from calcium hydride.

f. Analysis of Copolymers:

The above copolymer composition and diene microstructure were obtained from infrared (IR) analysis, using a Perkin Elmer Infrared Spectrometer, Model 21. The isomer content was determined on the copolymers dissolved in carbon disulfide (2 grams of copolymer per 100 ml of solution). The amount of total unsaturation present as vinyl and trans-1,4 was calculated according to the equation, $$c = \frac{A}{al} \times 10^2,$$

where:
$c$ = The amount of butadiene present as trans-1,4 or vinyl-1,2 units in g dl$^{-1}$
$a$ = Absorptivity of the isomer unit in ml g$^{-1}$ cm$^{-1}$
$l$ = Cell path length in cm
$A$ = The absorbance value defined in Beer's law The amount of the total unsaturation present as trans-1,4 and vinyl-1,2 was calculated using the following data:

trans-1,4: 966 cm$^{-1}$ micron band and $a$ = 1950
vinyl: 909 cm$^{-1}$ micron band and $a$ = 2841

The percentage of the total unsaturation present as cis-1,4 was obtained by subtracting the percent of the trans-1,4 plus vinyl from 100 percent. The styrene content was determined from the infrared spectrum using the 697 cm$^{-1}$ band and the equation:

$$c = \frac{10^2}{a}(A/l - Ao),$$

where $a$ = 2250. The factor $Ao$ = 0.44 was determined from calibration of the instrument with mixtures of homopolymers of styrene and butadiene of known composition and microstructure. Refractive index measurements were also used for obtaining the weight percent of the styrene.

The comonomer sequence distribution was determined from NMR (nuclear magnetic resonance). The NMR analysis utilized resonance peaks at 2.85$r$, 3.0$r$ and 3.5$r$. It has been reported that isolated styrene units show only the single aromatic peak at 2.85$r$ while runs of three or more styrene units exhibit the two resonance peaks at 3.0r and 3.5r [Mochel, V. D. and Johnson, B. L., Rubber Chem. and Tech., 43(5), 1138 (1970)].

GPC data were made on the copolymers as a 1 percent by weight solution in benzene. The column oven was held at 45°C. and the differential refractometer at 55°C. The injection time of the sample was 60 sec. The column configuration for all polymers analyzed was $10^6$ + 1.5 × $10^5$ + $10^5$ + 0.75 × $10^4$.

Osmometry was carried out in toluene at 25°C. using the Mechrolab Membrane Osmometer in order to obtain number-average molecular weights.

Differential thermal analysis measurements were made at a heating rate of 20°C. per minute commencing at approximately −170°C.

EXAMPLE II

The method including tests and analysis of this example was the same as that of Example I, above, except as otherwise noted. The catalyst complex of (Bu)$_2$Mg and Ba(t-BuO)$_2$ was used to prepare polybutadienes in either benzene or toluene. The structural analysis, as shown in Table II, below, shows that a high trans-1,4 polybutadiene was formed in either solvent.

TABLE II

Structure of Polybutadiene Prepared With Barium t-Butoxide-Dibutyl Magnesium Catalyst

| Run No. | Pzn. Solvent | Mole Ratio Ba(t-BuO)$_2$/(Bu)$_2$Mg | Diene Structure % Trans | Diene Structure % Vinyl | Estimated $\bar{M}_n$ by GPC | Final % Conv. by Wt. |
|---|---|---|---|---|---|---|
| 11 | Benzene | 1.9 | 72 | 8 | 121,000 | 96 |
| 12 | Toluene | 2.0 | 77 | 8 | 86,000 | 72 |

Polymerization conditions:

1. Polymerizations were carried out at 50°C. for 24 hours.
2. Molar concentrations of butadiene and (Bu)$_2$Mg were: [(Bu)$_2$Mg] = 1.25 × 10$^{-3}$ and [Butadiene] = 2.5.

A slightly larger trans-1,4 content was obtained for the polymer prepared in toluene. The number-average molecular weight found for the sample prepared in toluene was larger than the value of the calculated molecular weight, 51,000, suggesting that chain transfer to toluene did not occur.

EXAMPLE III

The method including tests and and analysis of this example was the same as that of Example I, above, except as otherwise noted. The Ba(t-BuO)$_2$/(Bu)$_2$Mg catalyst provides a means of obtaining solution rubber, in quantitative yield, for a range of polymer compositions as shown by the results given in Table III. The comonomer sequence distribution of the copolymer formed in Run 22 was determined to be random from NMR. A single aromatic peak was observed at 2.85r for the isolated styrene units of the copolymer.

TABLE III

Butadiene Homo And Copolymers Prepared In High Yield With The Barium t-Butoxide-Dibutyl Magnesium Catalyst

| Run No. | Pzn. Solvent | Mole Ratio Ba(t-BuO)$_2$/(Bu)$_2$Mg | Copolymer Wt. % Styrene | Polybutadiene Microstructure % Trans | Polybutadiene Microstructure % Vinyl | Final % Conversion By Wt. |
|---|---|---|---|---|---|---|
| 21 | Toluene | 0.31 | 0.0 | 78 | 8 | 100 |
| 22 | Toluene | 0.83 | 14.7 | 78 | 9 | 92 |
| 23 | Toluene | 0.31 | 16.9 | 85 | 9 | 100 |
| 24 | Toluene | 0.31 | 27.8 | 86 | 9 | 100 |

The embodiments of the invention in which an exclusive property or privilege is claimed are defined as follows:

1. A composition of matter useful in anionic polymerization and comprising a hydrocarbon soluble complex of
   1. 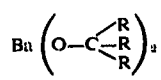

in which R is selected from the group consisting of methyl, ethyl and propyl radicals and wherein each R may be the same or different and
   2. dibutyl magnesium in which at least about 30 mole % of the butyl radicals are secondary butyl radicals, the mole ratio of said barium compound to said magnesium compound being from about 0.25 to 3.25.

2. A composition according to claim 1 in which said mole ratio is from about 0.30 to 3.0.

3. A composition according to claim 2 in which R is methyl and the magnesium compound is n-butyl-sec-butyl magnesium.

4. A composition according to claim 3 in which in said magnesium compound about 50 mole % of the butyl radicals are secondary butyl radicals.

5. A composition according to claim 1 in which R is methyl.

6. A composition according to claim 1 in which R is ethyl.

7. A composition according to claim 1 in which R is propyl.

8. A composition according to claim 1 in which said dibutyl magnesium compound has the formula (n-C$_4$H$_9$)Mg(sec-C$_4$H$_9$).

9. A composition according to claim 1 in which said dibutyl magnesium compound has the formula (n-C$_4$H$_9$)$_2$Mg . (sec-C$_4$H$_9$)$_2$Mg.

10. A composition according to claim 1 in which said dibutyl magnesium compound has the formula [(n-C$_4$H$_9$)$_2$Mg]$_2$ . (sec-C$_4$H$_9$)$_2$Mg.

* * * * *